3,605,904
Patented Sept. 20, 1971

3,605,904
AGRICULTURAL PLOUGHS
Roger Hugh Rutterford, 7 St. James St.,
King's Lynn, Norfolk, England
Filed Apr. 30, 1969, Ser. No. 820,502
Claims priority, application Great Britain, May 3, 1968,
21,061/68
Int. Cl. A01b 3/16, 3/44
U.S. Cl. 172—212                                    3 Claims

ABSTRACT OF THE DISCLOSURE

A reversible plough has two sets of plough bodies mounted on a beam structure, the rear end of which is mounted on steerable depth control wheels mounted on a bogey, the steering of the plough being achieved by the superimposed effects of angling the bogey with respect to the plough beam and angling the wheels with respect to the bogey frame.

---

This invention relates to agricultural ploughs of the reversible quarter-turn type in which two sets of bodies are alternatively engageable with the soil. It has for an object to provide a relatively simple and robust construction which facilitates the accurate control of the furrows.

Reversible ploughs as normally constructed may be either of the fully mounted, semi-mounted or trailed type. In the latter two types, the beam carrying the plough bodies is supported at its rear end on one or more depth control wheels which are normally pivotally mounted on the beam to provide caster action. A disadvantage of this arrangement is that when the tractor begins to turn at a headland, the beam trails behind the tractor on the chord of the arcuate path described by the tractor so that the plough bodies trace curved furrows unless they are raised before the tractor commences its turn. Curved furrow ends are objectionable, whilst raising of the plough bodies at the instant of commencement of the tractor's turn causes an objectionably large and ragged headland.

This invention consists in a reversible plough wherein two sets of plough bodies are mounted on a beam structure which is adapted to be connected to a tractor in such a way that the beam is freely pivotable in a horizontal plane, the rear end of the beam being pivotably supported on a steerable depth control wheel or wheels, whose lock at any instant is determined partly by the position of one or other sets of bodies and partly by the lock of the tractor steering wheels.

Preferably the lock of the depth control wheels is determined partly by the angle between the plough beam and the tow bar connecting it to the tractor.

When one set of plough bodies is brought into its operative position the steerable depth control wheels are set to guide the rear end of the plough beam in a path offset from the centre line of the tractor by the amount necessary to separate adjacent furrows. On this basic steering component is superimposed a second steering component due to any articulation in the horizontal plane between the tractor and the plough, so that when the tractor deviates, or is steered, to say, the right, the steerable depth wheels supporting the beam are set on a left lock. In this way, the rear end of the beam is held more accurately along the original line of travel of the tractor for sufficient time to enable the furrows to be run up to the line of the headland without unacceptable curvature. The plough is thus made more manoeuverable.

Preferably, the plough bodies are mounted in pairs on cantilever arms which are locked at a relatively wide dihedral angle to each other on a common pivot axis parallel to the longitudinal axis of the beam. The angle between the cantilever arms is chosen so as to ensure clearance of obstructions by the inoperative set of bodies.

Conveniently, the cantilever arms of one set of bodies are directly linked to the steering mechanism of the trailing steerable depth wheels so that as the chosen set of bodies are lowered on their arms into the working position, the depth wheels are pivoted so as to ensure the correct offset of the rear end of the beam during a ploughing traverse.

Advantageously the beam is of hollow section construction consisting of a plurality of relatively small and light longitudinal frame members in the form of lengths of square, rectangular or circular hollow steel sections with flanges welded to their ends. These sections may be joined together by bolting flanges together and each flange may be extended downwards to carry the pivots for the cantilever arms supporting the plough bodies and the associated mechanism for raising and lowering the sets of bodies.

One practical embodiment of the invention will now be described, by way of example only, with reference to the accompanying drawings in which.

Figure 1:
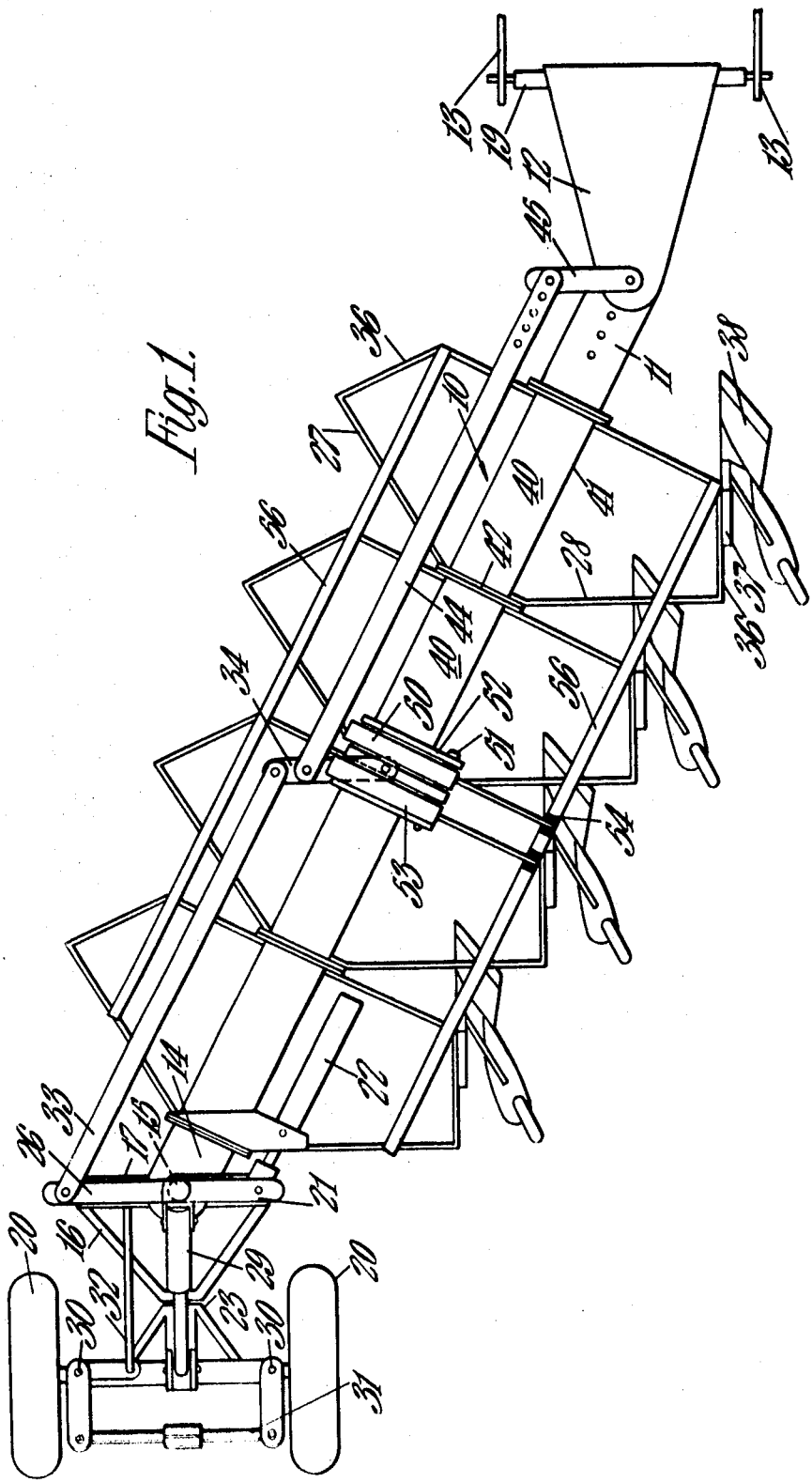
FIG. 1 is a plan view of a 4-furrow plough in accordance with the present invention, all the bodies being omitted from the inoperative set for simplicity of illustration.
Figure 2:
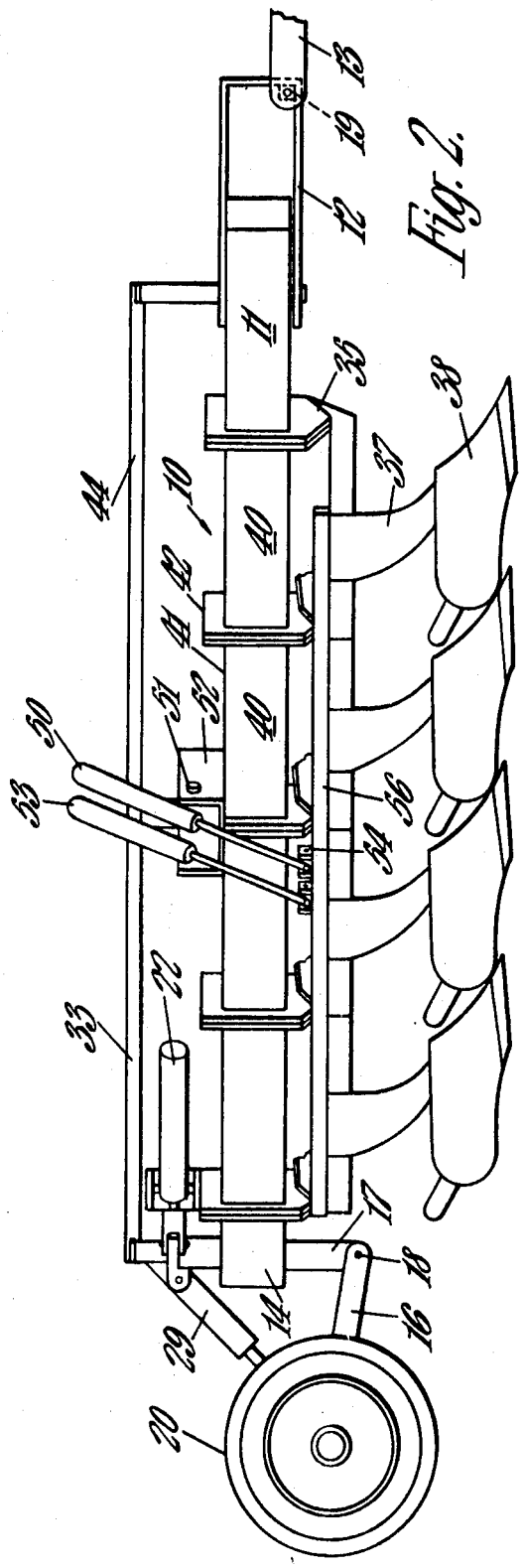
FIG. 2 is a side elevation of the plough of FIG. 1, the inoperative bodies again being omitted.

The plough illustrated in FIGS. 1 to 4 comprises a sectional beam structure 10 having a towing section 11 to which is pivoted a jaw 12 and cross-shaft 19 for attachment to conventional tractor lower links shown fragmentarily at 13.

The rear end of the beam 10 has a rear supporting section 14 carrying a vertical or substantially vertical pivot 15 for the trailing bogey 16. The latter consists of a frame incorporating a horizontal trunnion pivot 23 attached to a vertical cross-tree 17 which is also engaged with the pivot 15. The leading end of the bogey frame 16 is mounted on the base of the cross-tree 17 on horizontal pivots 18, whilst its trailing end is supported on a pair of depth control wheels 20.

The top of the cross-tree 17 carries an arm 21 (shown in detail in FIG. 4) connected to the end of a hydraulic servo motor (or jack) 22 mounted on the beam 10 whose function is to control the angle of the bogey 16 relative to the beam 10 about the pivot 15. The trailing end of the bogey 16 is braced against the beam 10 in the vertical plane by a hydraulic jack 29 which serves to control the height of the rear end of the beam 10, as will be described below.

The depth control wheels 20 are steerable on the bogey frame 16 by means of conventional king pins 30. The wheels are interconnected by means of a track rod 31 and are controlled for angular deflection relative to the bogey by a short drag link 32, which is connected to an arm 24 mounted at the base of a vertical shaft 25 passing through the centre of the cross-tree 17 and rotated by means of another arm 26 at the top. This arm is moved by a drag link 33, intermediate arm 34 and drag link 44 and arm 45 by movement of the jaw 12 and cross-shaft 19 due to steering of the tractor. The connecting positions of the drag links 33 and 44 to the arms 26, 34 and 45 are adjustable by means of a series of alternative holes in the arms. This mechanism thus operates such that as the tractor deviates to the right, the wheels 20 are inclined to the left, thus causing the rear of the plough to follow more closely the actual path of the tractor.

Each cantilever 27, 28 is of generally triangular shape in plan having the corners of its base integral with or locked to corresponding points of the cantilever of opposite hand so that the two cantilevers lie at a wide dihedral angle to each other and can move in unison about a horizontal pivot 35 located in the central vertical plane of the array. The apex of the triangle of each cantilever 27, 28 is cut off to form an oblique mounting bar 36 for the conventional leg 37 of a plough body 38.

The beam 10 consists of a plurality of sections 40, each section consisting of a length of square hollow section steel, 41, with plates 42 welded on at each end. Each plate 42 is extended downwards to carry the pivots 35 for the cantilevers 27, 28. Each section 40 thus carries a pair of cantilevers 27, 28 as a unit, and any number of sections 40 can be bolted together to provide the requisite number of bodies to be used at one time. The forward and trailing frames 11, 14 are similarly detachable so that an entire beam can be dismantled or extended at will. This facilitates manufacture and distribution of ploughs for various numbers of furrows, and the adjustment of ploughs on the farm to cater for changing numbers of furrows.

Figure 3:
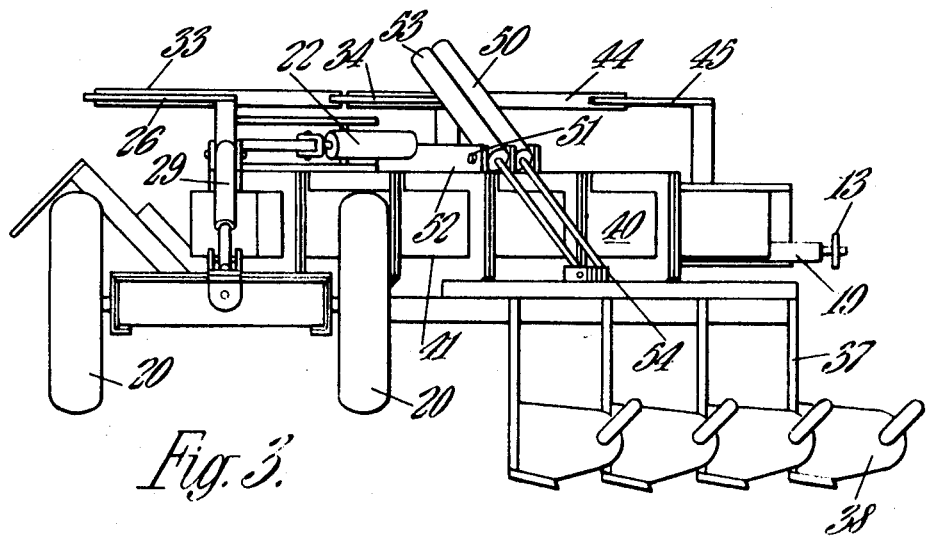
FIG. 3 is an end elevation of the plough, again omitting the inoperative bodies.
Figure 4:
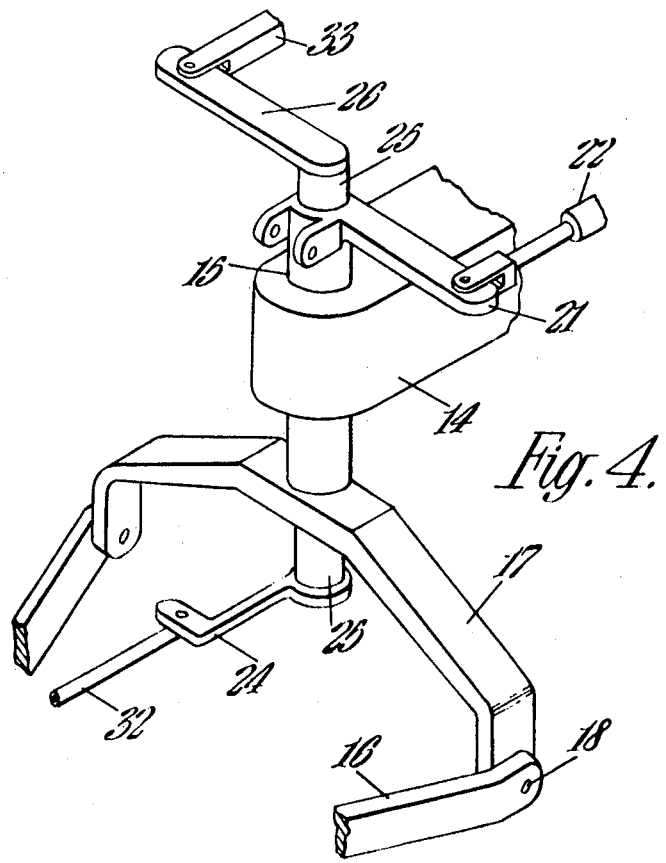
FIG. 4 is a scrap view illustrating in detail the construction of the rear pivot of the plough beam.

The cantilevers 27, 28 are set at a relatively wide angle to each other of the order of 135° as seen best in FIGS. 3 and 4. A motion about its pivot 35 of a pair of cantilevers thus serves to withdraw one plough body 38 from the ground and engage its opposite-hand counterpart. In the arrangement as illustrated, the cantilevers 27, 28 are rigidly strapped to their fellows of the same hand by means of rigid bars 56 which are clamped across the sides of the triangles of all the corresponding brackets so as to compel all the right-hand and all the left-hand bodies to swing about the longitudinal pivot axis 35 in unison. This interchange motion is effected by means of a hydraulic ram and cylinder motor 50 mounted on trunnions 51 in a bracket 52 mounted on one pair of flanges 42. The ram of the motor 50 is pinned to one of the rigid bars 56 by a bracket 54.

Mounted in trunnions and pinned to rigid bar 50 is also a hydraulic pump 53 which is actuated whenever motor 50 operates. Pump 53 is in closed circuit with hydraulic servo motor 22, which is connected via arm 21 to the cross-tree 17.

Thus any motion of the cantilevers 27, 28 about their pivots 35 results in a simultaneous and proportional movement of the bogey 16 and cross-tree 17 about the pivot 14 relative to the main beam 10.

Assuming that all the bodies are raised—i.e., the cantilevers 27, 28 are symmetrically disposed about the longitudinal vertical plane of the beam 10—the tractor lift arms 13 are raised, and the hydraulic strut 29 is fully extended, the bogey 16 is in line with the beam 10 and the whole assembly is in line with the tractor axis. This is a typical condition when not actually in work. The tractor driver then operates the hydraulic motor 50 to tilt the cantilevers 27, 28 about their axis 35 to bring one set of plough bodies 38 into the operative position whilst raising still further the bodies on the opposite side of the beam 10. This motion causes pump 53 to actuate servo-motor 22 and thereby to deflect the cross-tree 17 about its axis 15 so that the bogey is now inclined to the beam in the sense for offsetting the axis of the beam in the required direction and, on forward travel of the beam, to the desired extent for bringing the operative plough bodies into the lines of the respective furrows. The driver then operates a second hydraulic control to lower the tractor lift arms 13 and a third control to shorten the hydraulic strut 29 and cause the operative plough bodies 38 to penetrate the soil. The extent to which the lift arms 13 are lowered controls the depth of soil penetration of the front body 38, and the extent to which the strut 29 is shortened controls the depth of the rear body 38. As the tractor moves off, the beam 10 is towed behind it at an angle to the direction of travel which is controlled by the wheels 20.

So long as the tractor moves straight ahead, the depth wheels 20 are also in the straight-ahead position relative to the bogey 16. If, however, the tractor is steered into a turn, the cross-shaft 19 and jaw 12 are turned relative to the main beam 10. This causes a movement relative to the beam of drag link 44 and arm 34, drag link 33, arm 26, shaft 25 and arm 24. This moves the drag link 32 and track rod 31 so as to deflect the wheels 20 on the opposite lock and to a proportional extent. The beam 10 thus begins to follow more closely the track of the tractor wheels instead of moving on a chord of the arc of the circle being traced by the tractor. When the tractor steering is returned to the straight ahead position, the wheels 20 are similarly returned to their straight ahead position.

When the tractor reaches the end of one traverse of the field to be ploughed, it is normal to make a three-point turn in order to bring the tracor back beside the last furrow ploughed.

As the tractor makes the first part of this turn, the wheels 20 are steered by the steering linkage described so that the operative plough bodies are at their working depths and continue to plough a relatively straight furrow for at least a short distance sufficient to bring the ends of the furrows up the edge of the headland. As the first plough body reaches this point, the driver elevates the linkage 13 on the tractor to raise the leading plough body 38 out of the ground and to decrease the depth of all the other bodies in proportion. The ends of some of the furrows, therefore, will become shallower than the rest of their lengths, but this irregularity is of relatively small importance. As the last body approaches the line of headland, the driver energises the strut 29 to raise the rear end of the beam 10 on the wheels 20.

As soon as the bodies are clear of the ground, the driver restores the cantilevers 27, 28 to their mid position, thus realigning the bogey 16 with the beam 10. The unit thus acts as a semi-trailer and is reversed by the tractor in the conventional way. When the tractor is realigned for its next ploughing operation, the driver depresses the previously inoperative plough bodies 38 and lowers the tractor linkage 13. As the last plough body 38 crosses the line of headland, he again shortens the strut 29 and ploughing proceeds as before.

The strut 29 acts as a depth control which may either be infinitely variable or may have discrete positions.

The trailing bogey frame 16 may be swung up and down on the pivots 18 by mechanical means other than the hydraulic jack 29—such as chains, cables, or rods and levers actuated mechanically by the relative motion of the tractor and the plough at the front caused by operation of the tractor lift arms.

The jaw 12 may be moved fore and aft along the towing section 11 by moving the pivot into alternative holes. In this way the plough may be adapted to suit tractors of various wheel widths, whether running with one wheel in the previous furrow or entirely on unploughed land.

I claim:

1. A reversible mold-board plough, comprising in combination:
   a tractor attachment member;
   a longitudinally extending beam structure substantially defining the location of a horiontal longitudinal pivot axis;
   two sets of plough bottoms mounted on said beam: one of said sets may be brought selectively into engagement with soil to be ploughed;
   a forward vertical pivot connecting a forward end of the beam structure with said tractor member;
   a bogey frame comprising at least one ground-engaging gauge wheel;
   a rearward vertical pivot connecting said bogey frame with a rearward end of said beam structure;

a mounting member for each gauge wheel;

a mounting member vertical pivot connecting each mounting member to said bogey and located rearwardly of said beam structure rearward vertical pivot, whereby each mounting member is itself located rearwardly of said beam structure rearward pivot;

an operative connection to move said bogey around said beam structure rearward vertical pivot in dependence upon the selection of said set of plough bottoms; and a mechanical linkage between the tractor attachment member and said mounting member whereby the mounting member can be caused to pivot around its vertical pivot in dependence upon the pivoting of said beam structure relative to the tractor attachment member and to the bogey round their respective vertical pivots.

2. A reversible plough as claimed in claim 1 wherein said plough bottoms are mounted in pairs on cantilever arms which are locked at a dihedral angle to one another on said horizontal longitudinal pivot axis, and the plough bottoms in each set thereof extend parallel to said axis.

3. A plough as claimed in claim 1 wherein said mechanical linkage between the tractor attachment member and said mounting member comprises a double drag link having a first drag link component extending parallel to said horizontal longitudinal pivot axis, an intermediate connecting arm, and a second drag link component extending parallel to the direction of bogey travel in normal use.

References Cited

UNITED STATES PATENTS

| | | | |
|---|---|---|---|
| 826,154 | 7/1906 | Doolittle | 285—412 |
| 1,257,282 | 2/1918 | Davis et al. | 172—677 |
| 3,357,501 | 12/1967 | Watts | 172—212 |
| 3,511,317 | 5/1970 | Rickey | 172—212 |

FOREIGN PATENTS

| | | | |
|---|---|---|---|
| 212,736 | 3/1924 | Great Britain | 172—169 |
| 645,213 | 10/1950 | Great Britain | 172—224 |
| 769,318 | 3/1957 | Great Britain | 172—319 |
| 1,023,095 | 3/1966 | Great Britain | 172—285 |
| 459,904 | 9/1949 | Canada | 172—285 |

ROBERT E. PULFREY, Primary Examiner

C. W. HANOR, Assistant Examiner

U.S. Cl. R.R.

172—285